Figure 1:
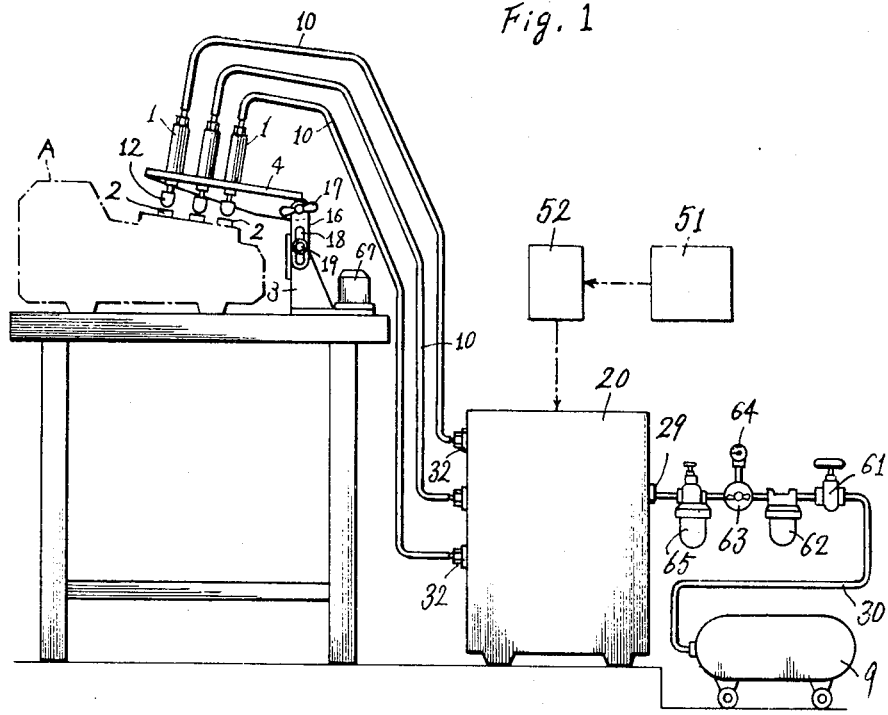

United States Patent

[11] 3,597,981

[72] Inventors Hiroyoshi Wakabayashi;
 Yousuke Fukui, both of Osaka-shi, Japan
[21] Appl. No. 866,347
[22] Filed Oct. 14, 1969
[45] Patented Aug. 10, 1971
[73] Assignee Asahi Automatic Machine-Tool Works Co., Ltd.
 Osaka-shi, Japan
[32] Priority Oct. 15, 1968, Nov. 7, 1968
[33] Japan
[31] 43/75161 and 43/81793

[54] KEYBOARD-TESTING DEVICE FOR CALCULATING MACHINE OR THE LIKE
3 Claims, 8 Drawing Figs.
[52] U.S. Cl. .................................................... 73/432
[51] Int. Cl. ............................................. G01m 19/00

[50] Field of Search .......................................... 73/432;
 235/145, 146

[56] References Cited
UNITED STATES PATENTS
3,003,694  10/1964  Oxley et al. .................... 235/146

*Primary Examiner*—S. Clement Swisher
*Attorney*—Wenderoth, Lind & Ponack

ABSTRACT: A keyboard-testing device for a calculating machine having keys on its keyboard or the like. A plurality of air cylinders are mounted on a panel board just above the keyboard of the calculating machine to be tested so as to depress any one of the keys. A plurality of control valves are connected to the respective air cylinders so as to supply and cut off compressed air from a compressor. An order system and electric control means is provided for controlling the operation of each of said control valves.

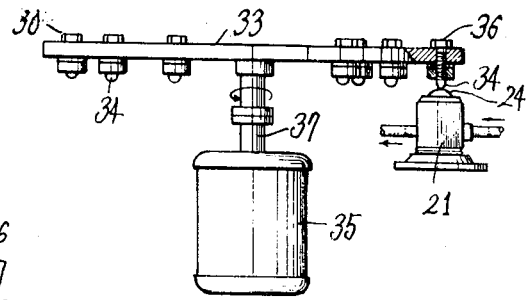
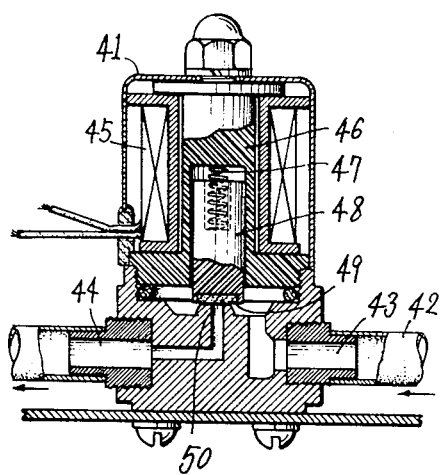
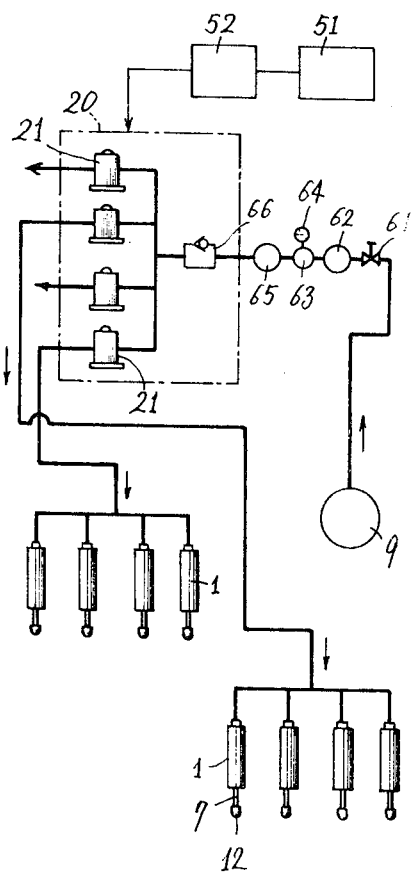
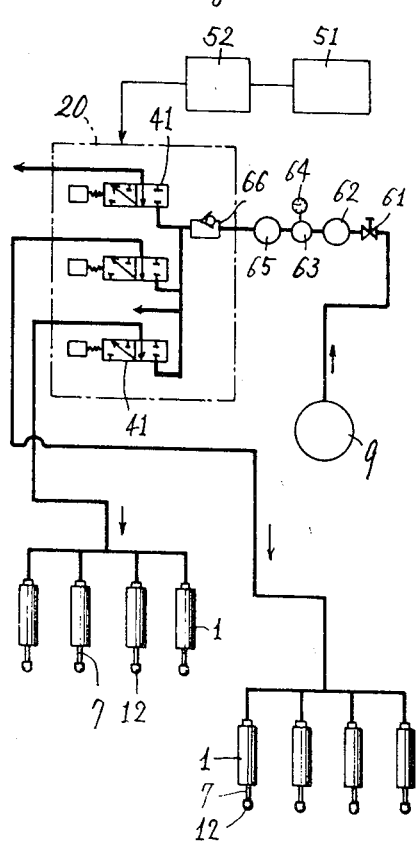

KEYBOARD-TESTING DEVICE FOR CALCULATING MACHINE OR THE LIKE

The present invention relates to a keyboard-testing device for such a machine having keys on its keyboard as an electric calculating instrument or the like, and more particularly, to a keyboard-testing device for testing the operativeness of the keyboard component thereof.

In a calculating instrument having keys on its keyboard, for example, an electric calculator, it has been well known that, because incorrect calculation due to erroneous operation of the instrument is vital to the acceptability thereof in the field in which it is used, the test operation in relation to the keyboard is repeated subject thereto before it is marketed, for the purpose of checkup of incorrect calculation and subsequent adjustment thereof. In this case, the repeated test operation is normally carried out in such a manner that an attendant worker pushes each of the keys of a single calculator some hundred to some thousand times. Thus, such test operation is so complicated that it requires much of time and labor, accompanying with many problems in respect to the precision, quality, and performance of such calculator.

A prime object of the present invention is to provide an automatic testing device for testing the operativeness of the keyboard by means of the piston rods disposed within the respective air cylinders and arranged just above each of the keys on the keyboard to be tested, with substantial elimination of the attendant worker.

With such automatic keyboard-testing device of the present invention, the repeated test operation can be performed with the application of compressed air to be supplied to each of the cylinders and then to be controlled by the control valve, the number of repetition of the test operation capable of being defined by a programmed instruction.

Figure 2:
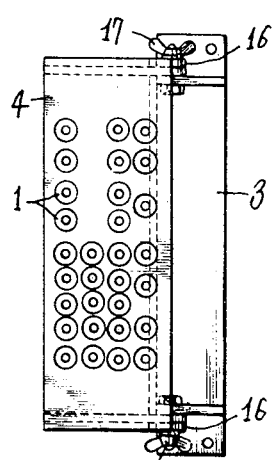
Figure 3:
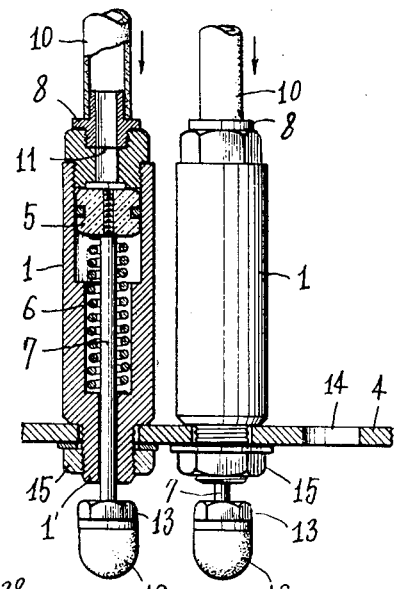
Figure 4:
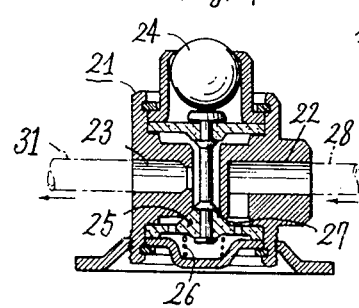

Other objects and features of the present invention will be apparent from the following description taken in conjunction with embodiments of the present invention with reference to the accompanying drawings, in which:

FIG. 1 is a side view of a keyboard-testing device of the present invention illustrated together with an electric calculator to be tested thereby, FIG. 2 is a plan view of an air cylinder fittings, FIG. 3 is a side view, on an enlarged scale, of air cylinders, one of which is illustrated in longitudinal section, FIG. 4 is a longitudinal sectional view of a ball-cam valve employed as a control valve in the present invention, FIG. 5 is a front view of a drive member for operating the ball-cam valve.

FIG. 6 is a block diagram showing the operational system of the keyboard-testing device of the present invention, FIG. 7 is a longitudinal sectional view, on an enlarged scale, of an electromagnetic control valve employed in the second embodiment of the present invention for the control valve, and FIG. 8 is a block diagram showing the operational system of the keyboard-testing device of the present invention in which the electromagnetic control valve is applied.

As can be understood from the accompanying drawings, a prime feature of the keyboard-testing device of the present invention is in the provision of the air cylinders operable to push the corresponding keys on the keyboard of an electric calculator through the respective piston rods, means for supplying compressed air to the air cylinders, and control and drive apparatuses.

Referring now to FIG. 1 in which an exemplary type of electric calculator is illustrated in the tested condition with the use of the device of the present invention, reference numeral 1 is a plurality of air cylinders downwardly fitted to a rigid panel board 4 of a mounting 3 relative to each axis thereof and disposed just above the keyboard of the calculator A so that each of the air cylinders 1 may be in the position to push the corresponding key 2 of the calculator A. Each of said air cylinders 1 is provided therein with a piston 5 and a piston rod 7 as shown in FIG. 3, the latter being connected to said piston 5 and capable of being downwardly moved thereby and being upwardly returned by an expansion spring 6. Each of said air cylinders 1 is also provided with a mouth piece 8 screwed to an upper end thereof. Said mouth piece 8 is provided with a hollow connection 11 to be connected with an air pipe 10 for supplying compressed air from a compressor 9 into the air cylinder 1.

Reference numeral 12 is a pad made of, for example, resilient rubber material and fitted to a projecting free end of the piston rod 7 so that said pad directly pushes the key 2 as the piston rod 7 is downwardly moved. Said pad may be fitted to the free end of the piston rod 7 by means of a threaded fittings 13 so that it provides a fine adjustment of the pad 12 in respect to the vertical position thereof. Although material for said pad 12 is employed with resilient rubber in this embodiment, it is noted that other means effective to provide the same function as said resilient rubber pad, for example, a spring means or the like, can be employed.

The panel board 4 for supporting the air cylinders 1 thereon is provided, as shown in FIG. 2, with a plurality of perforated openings 14 on its surface, the number of which is corresponded with the number of the keys of the calculator A. Accordingly, each of the same number of the air cylinders 1 can be secured to said panel board 4 in such a manner as to insert its threaded end 1' into the opening 14 and then to fasten a nut 15 to said end 1'. In addition thereto, the panel board 4 thus provided with the air cylinders 1 is mounted on an upper portion of each bracket 16 by means of thumbscrews 17 around which it can swing. Therefore, the inclination of said panel board 4 can be adjustable at any angle. Provided in the brackets 16 is respective slots 18, each of which is vertically slidably connected with a mounting by means of a bolt and nut 19 to permit adjustment of the vertical position of said panel board 4.

Reference numeral 20 is a control box accommodating therein control valves each being connected to the respective air cylinders 1 and a drive means associated with said valves, all of which in the box 20 are for controlling the operation of the air cylinders. Said valves which are used in the present invention may be either mechanical ball-cam valves 21 or electromagnetic valves which will be hereinafter fully described.

Referring to FIGS. 4 and 5, each of the ball-cam valves 21 comprises an air inlet 22 at one side, an air outlet 23 at the other side to be connected to the corresponding air cylinders 1, a steel ball 24 collapsibly disposed within said ball-cam valve body while a portion of said ball at an upper portion of said valve body is exposed outside, and a diaphragm valve 25 disposed within said valve outside, and operable in association with said ball 24. The diaphragm valve normally closes its valve port 27 under the influence of the resilient force of a spring 26 and, as it is downwardly depressed in connection with the movement of the ball 24, will open its valve port 27 to communicate the air inlet 22 and the air outlet 23. All of the air inlet 22 for each of the ball-cam valves 21 are combined through the respective pipings 28 to a single terminal 27 disposed on one sidewall of the box 20, which is in turn connected to an air compressor 9 by means of a single air conduit 30. On the other hand, all of the air outlet 23 for each of the ball-cam valves 21 are respectively connected to the air cylinders 1 by means of the individual pipings 31 and 10 through the terminals 32 disposed on the opposite sidewall of the control box 20.

The ball-cam valves are to be operated by a single cam disc 33 as shown particularly in FIG. 5. It will be understood that the cam disc 33 to be rotated by a motor 35 around the axis thereof is provided at its lower surface with a plurality of protrusions in a suitable arrangement. The ball-cam valves 21 are disposed beneath said cam disc 33 so that the balls 24 in the respective valves 21 may be collapsed one after another in contact with the protrusions 34 as the latter circulates in connection with the rotational movement of the cam disc 33. The arrangement of said protrusions 34 can be optionally modified by means of adjusting fitting positions of respective screws 36, or another cam disc having on its lower surface provided with said protrusions 34 in a modified arrangement may be substituted and connected to a connecting rod 37 of the motor 35 for this same purpose.

In this construction as hereinbefore described, upon operation of the motor 35 the cam disc 33 is rotated by means of the connecting rod 37 of the motor around the axis of said connecting rod at a predetermined slow speed with the result that the balls 24 in the respective ball-cam valves 21 are collapsed on after another in contact with the protrusions 34 as they successively approach to the respective positions just above said balls. When the balls 24 are so collapsed, just above air inlet 22 and air outlets 23 of any one of the valves 21 having the ball so collapsed is communicated to each other, and compressed air is then supplied from the compressor 9 into the air cylinders 1 through the respective pipings 10. Any one of the keys 2 on the keyboard of the calculator A is depressed by the corresponding one of the pads 12 as the piston 5 and piston rod 7 connected therewith are downwardly moved against the resilient force of the expansion spring 6 upon application of the compressed air to said air cylinders 1. Subsequently as any one of the protrusions 34 having positioned just above the corresponding one of the balls 24 leaves apart from the contact with the balls in connection with the further rotational movement of the cam disc 33; collapsion of the balls is released resulting in that the diaphragm valve 25 is returned to its original position under the influence of the resilient force of the spring 26 to close the port 27 and thereby to cease the supply of compressed air to the air cylinders 1. Therefore, any one of the piston rods 7 in the air cylinders is upwardly moved under the influence of the resilient force of the expansion spring 6 to return to its original position.

In practice, the electric calculator is normally provided on its keyboard with a plurality of keys such as numerical keys representing 0 to 9, addition key, subtraction key, multiplication key, division key, etc. In this instance, if all of these keys are designed to be depressed successively one after another by the pads 12 during one cycle of rotation of the cam disc 33 in such a manner that any one of the protrusions 34 acts against the corresponding balls as the cam disc provides one rotation, the test operation of the calculator can be performed in accordance with a programmed instruction.

According to the testing device of the present invention, a plurality of calculators can be tested at the same time with a single unit of said device only if a plurality of air cylinder units is connected to a single unit of the ball-cam valve 21 by means of suitable pipings for each group of calculators to be tested, as illustrated in the block system of FIG. 6.

Referring to FIGS. 7 and 8 in which the second embodiment of the present invention is shown, it is contemplated that the control valve, for which the ball-cam valve 21 is employed in the heretofore, fully described first embodiment, may be employed with an electromagnetic valve 41, the detail of which is clearly illustrated in FIG. 7.

Each electromagnetic valve 41 comprises an air inlet 43 connected at one side thereof to the air compressor 9 by means of an air conduit 42 for supplying compressed air thereto, an air outlet 44 connected at the other side thereof to the air cylinders 1, a stationary iron core 46 having windings 45 thereon, and a movable iron core 48 having a diaphragm attached thereto and normally urged by a spring 47 to close a port 50. The both iron cores 46 and 48 are disposed in the interior of the electromagnetic valve 41. The electromagnetic valve 41 may be connected oppositely to the air cylinders 1 and the compressor 9 in the same manner as hereinbefore described in conjunction with the ball-cam valve 21 in the first embodiment of the present invention.

Since the above-mentioned provision is made in the electromagnetic valve 41, when an electric current is applied to the windings 45, the stationary iron core 46 is excited to cause the movable iron core slidably disposed in a hollow portion of said stationary iron core to be upwardly moved against the resilient force of the spring 47. At this time, the diaphragm 49 separates from the port 50 to permit the flow of compressed air from the compressor 9 to the air cylinders 1 through the inlet 43 and then the outlet 44.

Operation of the electromagnetic valve 41 is carried out in association with an order system 51 and an electric control means 52 connected to the control box 20. In this arrangement, the electromagnetic valve 41 may be operated to actuate the air cylinders 1 in response to a signal issued from the order system 51 in accordance with a programmed instruction in which the test formula is given as desired, while a switch in the electric control means 52 is in the On-postion.

In FIGS. 1, 6, and 8, reference numeral 61 is a cutoff valve disposed in the air conduit 30 between the terminal 29 on the control box 20 and the compressor 9, 62 is an pneumatic filter in the conduit 30 therebetween 63 is a regulator valve having a pressure gauge 64, 65 is an oiler, 66 is a regulator valve disposed within the control box 20, and 67 is a counter for counting the number of operation of any one of the keys 2 performed by the corresponding air cylinders 1.

From the above full description of the present invention taken in conjunction with the first and second embodiments of the present invention, it can be understood by those skilled in the art that the test device of the present invention can be applied for testing the operativeness of any instruments having keys, for example, a typewriter for use in combination with an electronic computer, a piano, an electric switch, etc. with slight modification in the shape, structure, arrangement, and other factors of the air cylinder, cam valve and cam disc, and the electromagnetic valve in accordance with that of such a machine to be tested.

Although the present invention has been fully described in conjunction with the embodiments thereof taken only for the purpose of illustration, it is noted that the present invention is not to be limited thereby. It is also noted that such a modification that the two features illustrated in the accompanying drawings are interchanged to each other can be of course performed without departing from the scope and spirit of the present invention.

We claim:

1. A keyboard-testing device for testing a calculating machine or the like having keys on a keyboard, said device comprising a panel board, means on which said panel board is adjustably mounted for adjustment relative to a position parallel to and above a keyboard, a plurality of air cylinders mounted on said panel board in positions corresponding to the positions of the keys on the keyboard and each having a piston rod extending out of the air cylinder in a direction transverse to the panel and toward the keyboard, the free end of each piston rod having a pad on the end thereof, compressed air supply means coupled to each of said air cylinders for driving the pistons toward the keys of the keyboard, spring means in each air cylinder for returning the pistons upon release of the air pressure, a plurality of control valves, one in each of the compressed air supply means, for controlling the supply of compressed air to said air cylinders, valve actuating means for actuating said valves, sand control means for controlling the valve actuating means according to a predetermined program for testing the calculating machine or the like.

2. A keyboard-testing device as claimed in claim 1 in which said valves are mechanically actuated valves, and said valve-actuating means and said control means comprise a cam disc positioned adjacent said valves and movable relative to said valves for actuating said valves in a predetermined sequence, and motor means for driving said cam disc.

3. A keyboard-testing device as claimed in claim 1 in which said valves are solenoid actuated valves, and said valve-actuating means and said control means comprise an electric power supply to said valves and means for controlling the power supply to said valves in a predetermined sequence.